United States Patent [19]

Orglmeister

[11] Patent Number: 5,199,078

[45] Date of Patent: Mar. 30, 1993

[54] METHOD AND APPARATUS OF DATA REDUCTION FOR DIGITAL AUDIO SIGNALS AND OF APPROXIMATED RECOVERY OF THE DIGITAL AUDIO SIGNALS FROM REDUCED DATA

[75] Inventor: Reinhold Orglmeister, Berlin, Fed. Rep. of Germany

[73] Assignee: Robert Bosch GmbH, Stuttgart, Fed. Rep. of Germany

[21] Appl. No.: 489,261

[22] Filed: Mar. 6, 1990

[30] Foreign Application Priority Data

Mar. 6, 1989 [DE] Fed. Rep. of Germany ....... 3907551

[51] Int. Cl.⁵ .................................................. G10L 5/00
[52] U.S. Cl. ....................................... 381/47; 381/106
[58] Field of Search ................................... 381/47, 106

[56] References Cited

U.S. PATENT DOCUMENTS 4,856,068  8/1989  Quatieri ................................. 381/47

OTHER PUBLICATIONS

"Bit-rate reduction method for digital audio signals based on psycho-acoustic phenomena", by Detlef Krahe, pp. 117-123.
"Transform coding on Audio Signals using fixed bit allocation", by Reinhold Orglmeister, pp. 1-11.
"Magnitude and Phase Computation with the VSP-161", Zoran Technical Note.
"FFT Basics", Zoran Technical Note, pp. 1-10.
Zoran Technical Note, "Magnitude and Phase Computation with the VSP-161", Zoran Corporation, pp. 1-11, Sep. 1987.
Zoran Technical Note, "FFT Basics", Zoran Corporation, pp. 1-10, Mar. 1987.
IEEE Transactions on Consumer Electronics, vol. CE-33, No. 4, Nov. 1987, "MSC: Stereo Audio coding with CD Quality and 256 kBIT/SEC", E. F. Schroeder, et al., pp. 512-519.
"Bit Rate (data) reduction method for digital audio signals based on Psycho-acoustic phenomena", 1986, Rundfuncktechn. Mittsilungen, vol. 30, No. 3.
"Transform Coding on Audio Signals using fixed bit allocation", by Reinhold Orglmeister.

*Primary Examiner*—Emanuel S. Kemeny
*Attorney, Agent, or Firm*—Frishauf, Holtz, Goodman & Woodward

[57] ABSTRACT

For facilitating the transmission or recording of digital audio signals in a narrow band channel or at a reduced data rate without deterioration of audio quality detectable by the human ear, a digital audio signal is subdivided into overlapping time window segments and the segments are subjected to fast Fourier transformation, with generation of scaling factors. The spectral values resulting from the transformation are converted into separate magnitude and phase values, the former being logarithmically quantized and the latter being linearly quantized. The magnitude values corresponding to an upper portion of the spectrum are collected into groups of a size that increases towards the high frequency end of the spectrum and the magnitude values of each group are rms averaged, so that one value can serve in place of several magnitude values, thereby reducing the data to be transmitted or recorded. A final multiplexing of processed magnitude and phase values and of scaling factors precedes transmission or recording. For recovery of the digital audio signal there is corresponding preliminary demultiplexing operation. The magnitude values from the demultiplexer and the corresponding phase values are then used to provide spectral values each expressed in a real part and an imaginary part. Those outputs and the scaling factors are then subjected to inverse fast Fourier transformation (FFT), followed by inverse windowing, to produce an approximated audio digital signal which, when reproduced, cannot be distinguished by the human ear from a reproduction of the original digital audio signal.

8 Claims, 9 Drawing Sheets

5,199,078

METHOD AND APPARATUS OF DATA REDUCTION FOR DIGITAL AUDIO SIGNALS AND OF APPROXIMATED RECOVERY OF THE DIGITAL AUDIO SIGNALS FROM REDUCED DATA

This invention concerns a method of data reduction of digital audio signals by elimination of data to which the human sense of hearing is insensitive so that the audio data can be recorded or transmitted as a signal of lower bandwidth or data rate and then recovered in an approximated form that is virtually indistinguishable to the human ear from a reproduction of the original unreduced audio data.

Such a method is already known and was published in Rundfunktechnische Mitteilungen, 1986, Heft 3, pages 117-123. In that known method a coder was provided at the transmitting or recording end of a transmitting or recording channel and at the output (for reception or playback) of the transmitting or recording channel a decoder was provided.

In that known method a form of representation for the signal was found which reduced the data flow from the sound source (the digital audio signal) to the human sense of hearing. What resulted was an approximated digital audio signal, which made use on the one hand of the statistical properties of the signal and, on the other hand made use of the limited processing capability of the human sense of hearing in order to effectively conceal the loss of a portion of the data of which the human sense of hearing cannot take into account.

The known coder used in that method includes, in cascade, a device for passing the original audio data signal through a succession of overlapping time windows, a device for producing fast Fourier transformation (FFT) of the data, a device for data reduction and a multiplexer, the latter feeding the data-reduced signal into a channel such as a digital audio record or a digital audio transmission path. The decoder used in the method comprised a cascade of a demultiplexer, a device for recovery of approximated data, a device for inverse fast Fourier transformation and a device for putting the transformed data into overlapping time windows so as to produce at the output an approximated audio signal for sound reproduction. The known method conforms to FIG. 1, but not with the details of the apparatus and method illustrated with reference to FIGS. 2-6.

The known method and apparatus requires high technical complication and expense for data reduction in the coder and for approximated data recovery in the decoder. Furthermore, for the success of the known method it is necessary to transmit in the channel much collateral information that is subject to disturbance.

SUMMARY OF THE INVENTION

It is an object of the invention to provide a method of data reduction of digital audio signals and of approximated recovery of digital audio signals which makes use of overlapping windowing and fast Fourier transformation (FFT) for data reduction and the converse thereof for approximated reconstitution of the digital audio signals in which the expense of obtaining data reduction and approximated reconstitution is substantially reduced compared to the known system, and, moreover, a method in which only a minimum of collateral information vulnerable to disturbance needs to be transmitted or recorded.

Briefly, following the fast Fourier transformation (FFT) and the provision of accompanying scaling factors, the spectral values produced by fast Fourier transformation are separated into magnitude and phase values, then the magnitudes are logarithmicly quantized and the phase values linearly quantized. The logarithmicly quantized magnitudes, preferably only in the upper frequency region of the spectrum, are subdivided into groups of a size which is dependent upon the frequency and for each such group a representative value is obtained by averaging the magnitudes within the group and using that value in place of the respective values of the individual grouped magnitudes. Then the direct and representative values of magnitude and the linearly quantized phase values, as well as the scaling factors obtained from the FFT stage, are supplied to a multiplexer at the output of which the data-reduced digital signal is available for transmission or recording. After the transmission or recording the reduced signal is demultiplexed and the magnitudes, represented by representative values in the higher frequency ranges, are supplied, after a stage of preprocessing, along with the linearly quantized phase values, to a circuit for converting the reduced data into spectral values having real and imaginary parts and then those parts as well as the scaling factors obtained from the demultiplexer are subjected to inverse FFT transformation followed by reconstitution of a digital audio signal by overlapping windowing. Particular forms and procedures of overlapping windowing and of FFT and inverse FFT computation and generation and use of scaling factors have been found especially useful in the method of this invention.

The method of the invention is applicable to recording of sound in video recorders providing picture and sound segments in the recorded tracks as well as to transmission of television sound in satellite radio links, in cable facilities, and the like.

BRIEF DESCRIPTION OF THE DRAWINGS

The invention is further described by way of illustrative example with reference to the annexed drawings, in which:

FIG. 2b is a flow diagram of a modification of the method and apparatus illustrated in FIG. 2a;

DESCRIPTION OF THE ILLUSTRATED EMBODIMENT

Figure 1:
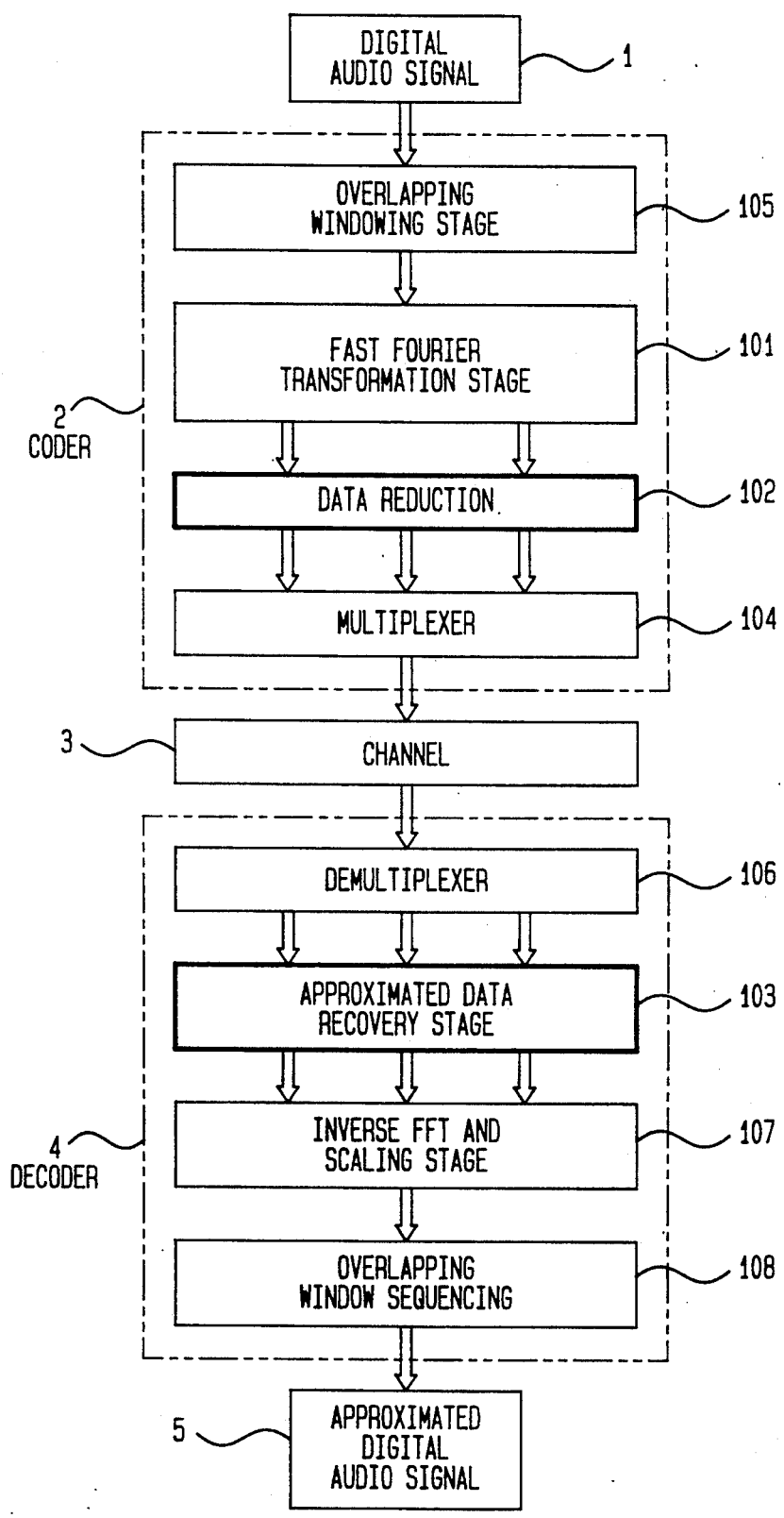
FIG. 1 is a generic flow diagram for data reduction methods and apparatus which diagram is common to both the above-described known system and to the method and system of the invention.

FIG. 1 is an overall diagram of the processing of a digital audio signal supplied at an input 1 processed in a coder 2, then transmitted over a channel 3 and then processed in a decoder 4, to produce a high quality approximated digital audio signal at an output 5. The channel 3 can be simply a transmission channel, or it can represent a recording channel for the storage of the signal on a record and including its reproduction in a playback channel. The advantage of the invention is that the data reduction produced in the coder 2 makes it possible to utilize a narrower channel without loss of quality perceivable by the human ear.

Figure 5:
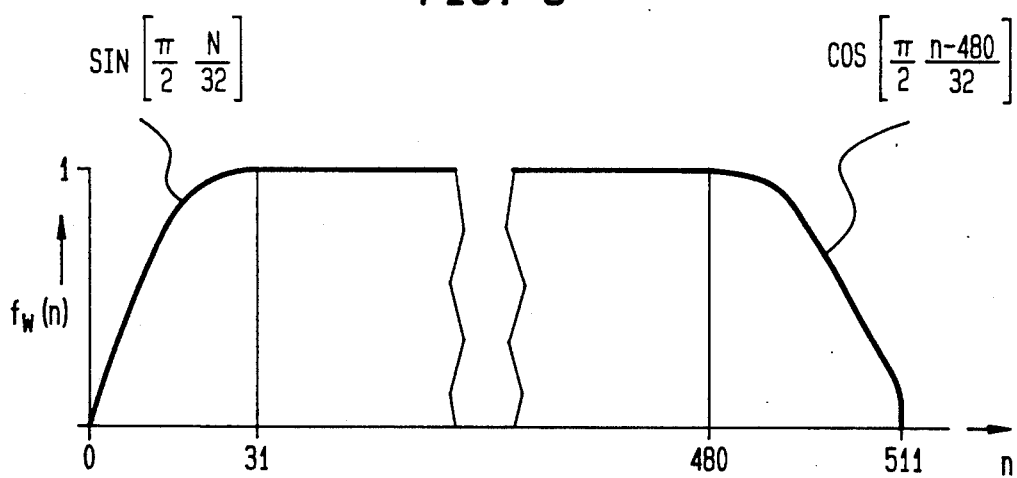
FIG. 5 is a diagram for explaining the rectangular cosine function utilized in an embodiment of the invention at the overlapping windowing stage 108 of FIG. 1.

The coder 2 includes a processing stage 105 for overlapping windowing which will be explained with reference to FIG. 4a and FIG. 5. The output of the stage 105 goes to a fast Fourier transformation (FFT) stage of a kind that provides auxiliary information referred to as "scaling" information as well as spectral values. The so-called discrete Fourier transformation (DFT) is used in the stage 101 instead of the frequently used discrete cosine transformation (DCT). The DCT does indeed offer, for statistical models of speech signals, a better approximation to the optimal transformation known as the Karhunen-Loéve transformation, but the DFT appears to provide better possibilities for utilizing the characteristics of the human ear (among other things, its limited phase resolution capability). The efficient implementation of DFT is performed by what is known as a fast Fourier transform (FFT) generation, for which there are a variety of digital circuits that are already known and readily available. The output of the stage 101 is provided to a data reduction stage illustrated in FIG. 2, which provides its outputs to a multiplexer 104 for interleaving the several outputs of the data reduction stage 102 for transmission over the channel 3.

Figure 3:
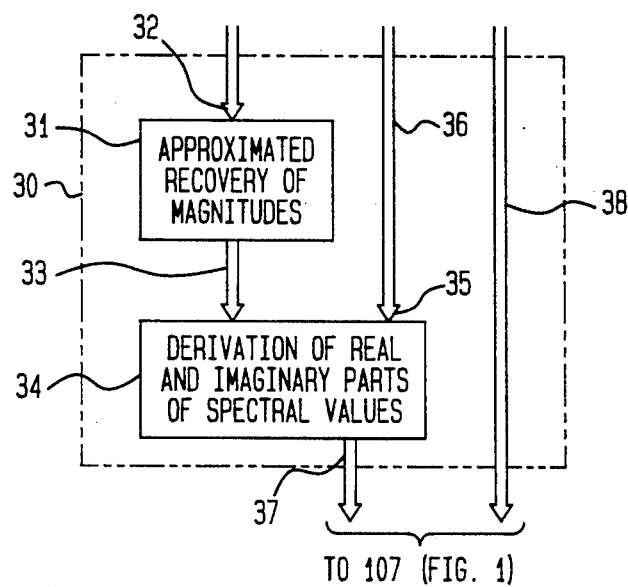
FIG. 3 is a flow diagram of a method and apparatus according to the invention for the step of recovering approximate data for use prior to the stage 107 of inverse FFT and scaling in the method of FIG. 1.

In the decoder 4 the output of the channel 3 goes to a demultiplexer which distributes the data to the several inputs of the stage 103 for recovery of approximated data, this stage being shown in more detail in FIG. 3. Its outputs are provided to an inverse FFT stage which converts spectral signals into time-based signals. It also performs the scaling or normalizing of the calculated time-based values, including normalization to the original signal amplitude level, and produces an output that is processed in a second overlapping windowing stage 108, the operation of which is explained with reference to FIG. 4b. The output 5 of the stage 108 is the approximated "high-quality" digital audio signal.

Figure 2A:
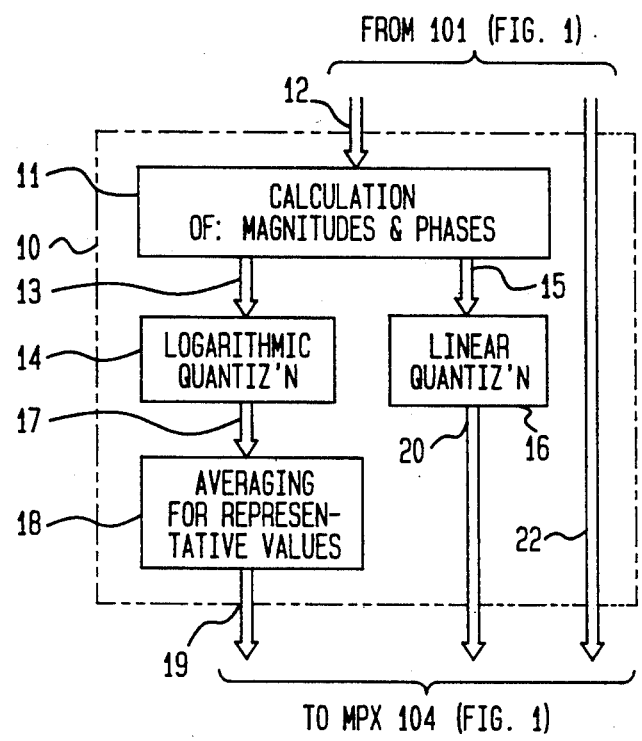
FIG. 2a is a flow diagram of a method and apparatus for data reduction according to the invention, for use after the FFT and scaling stage 101 of FIG. 1.

FIG. 2a shows an embodiment of data reduction equipment 2 according to the invention and FIG. 3 shows an embodiment of approximated data recovery equipment 30 in accordance with the invention that will now be described in detail.

The equipment 2 shown in circuit block form in FIG. 2 for data reduction is a portion of one kind of a coder 2 shown in FIG. 1 for use at stage 102 of FIG. 1. The equipment 30 for approximate data recovery shown in FIG. 3 is a part of one kind of a decoder 4 shown in FIG. 1 for use at the stage 103 of FIG. 1.

The equipment 2 for data reduction shown in FIG. 2a comprises a unit 11 for calculating the magnitudes and phases corresponding to the spectral values provided by fast Fourier transformation and supplied at inputs 12. The inputs collectively designated at 12 each receive 16-bit data words alternately representing real and imaginary components of spectral values. The several inputs correspond to frequency sub-bands, into which the prior FFT processing (101 in FIG. 1) has subdivided the audio signal. The clock frequency of 44.1 kHz conveniently corresponds to the standard for compact disks. Other formats are, of course, also possible. The unit 11 supplies the signal magnitude values for the respective frequency sub-bands at the outputs 13 from which they are supplied to corresponding inputs of a logarithmic quantizer 14. The unit 11 also supplies the phase values of the respective spectral value signals at respective outputs collectively designated 15, for supplying them to inputs of a linear quantizer 16.

The magnitudes at the outputs 13 and the phase values at the outputs 15 are, again, expressed in 16-bit data words. As such they are relatively finely quantized. They are respectively quantized more coarsely in the units 14 and 16.

In the unit 11 the inputs are real and imaginary parts of respective spectral values, and the magnitude and phases provided respectively at the outputs 13 and 15 are derived by a transformation from Cartesian coordinates into polar coordinates, thus $$Z = X + jY, \text{ where } X = Re(Z), Y = Im(Z)$$

$$Z = |Z| \cdot e^{j\phi}, \text{ where } |Z| = (X^2 + Y^2)^{\frac{1}{2}}, \phi = \arcsin \frac{Y}{|Z|}$$

$|Z|$ is magnitude; $\phi$ is phase.

The outputs 17 of the logarithmic quantizer 14 are connected to a unit for determining certain simplified representative magnitude values 18, which furnishes the direct and representative magnitude values at outputs 19 of the unit. These outputs 19, the outputs 20 of the linear quantizer 16 and a cable of conductors 22 from outputs of the fast Fourier transformation unit of FIG. 1, which furnish the FFT scaling factors, are all connected to corresponding inputs of a multiplexer which corresponds to the multiplexer 104 shown as the final stage in the coder of FIG. 1.

The data reduction unit 10 of FIG. 2a operates in the following manner. The outputs of the FFT unit 101 relating to the respective frequency sub-bands provide so-called spectral values and are produced by rapid calculations based on time window segments of a digital audio signal. The unit 11 of the decoder 2 calculates the magnitudes and the phases of these spectral values and supplies the magnitudes to the logarithmic quantizer 14 for quantization, while the calculated phases are supplied at the same time to the linear quantizer 16 for quantization. After logarithmic quantization the magnitudes of an upper frequency region are subdivided into a number of groups in the unit 15 for determining representative values by averaging. The sizes of the individual groups are so selected that they increase with increasing frequency. The unit 18 provides a representative value for each group by quadratic (r.m.s.) averaging of the magnitudes found in the several sub-bands of the group. The representative values thus obtained are substituted for the corresponding several magnitudes which they represent and are passed on to the multiplexer of FIG. 1 along with ungrouped low-frequency magnitudes and the linearly quantized phases, and also the scaling factors provided by the FFT unit 101 of FIG. 1. When all these are multiplexed together they are passed on to a recording or transmission channel.

As the result of the determination of representative values from the sub-band groups that become larger with increasing frequency, a supplementary data reduction is obtained that provides hardly any sacrifice of quality as perceived by the human ear when the approximated digital audio signal is recovered in the decoder and thereafter reproduced. Furthermore, little collateral information (only the scaling factors) is developed, because no adaptive allocation needs to be provided in the method of the invention.

The operation above-described for data reduction of the signal provided in the form of spectral values stands in contrast to the known method which utilizes adaptive bit aportionment. In the present method the processing of bits is among the individual spectral values within, in each case, a particular block of data. This represents a substantial simplification and makes possible a conpact implementation. The individual steps of the coding can be further explained step-by-step.

Figure 6:
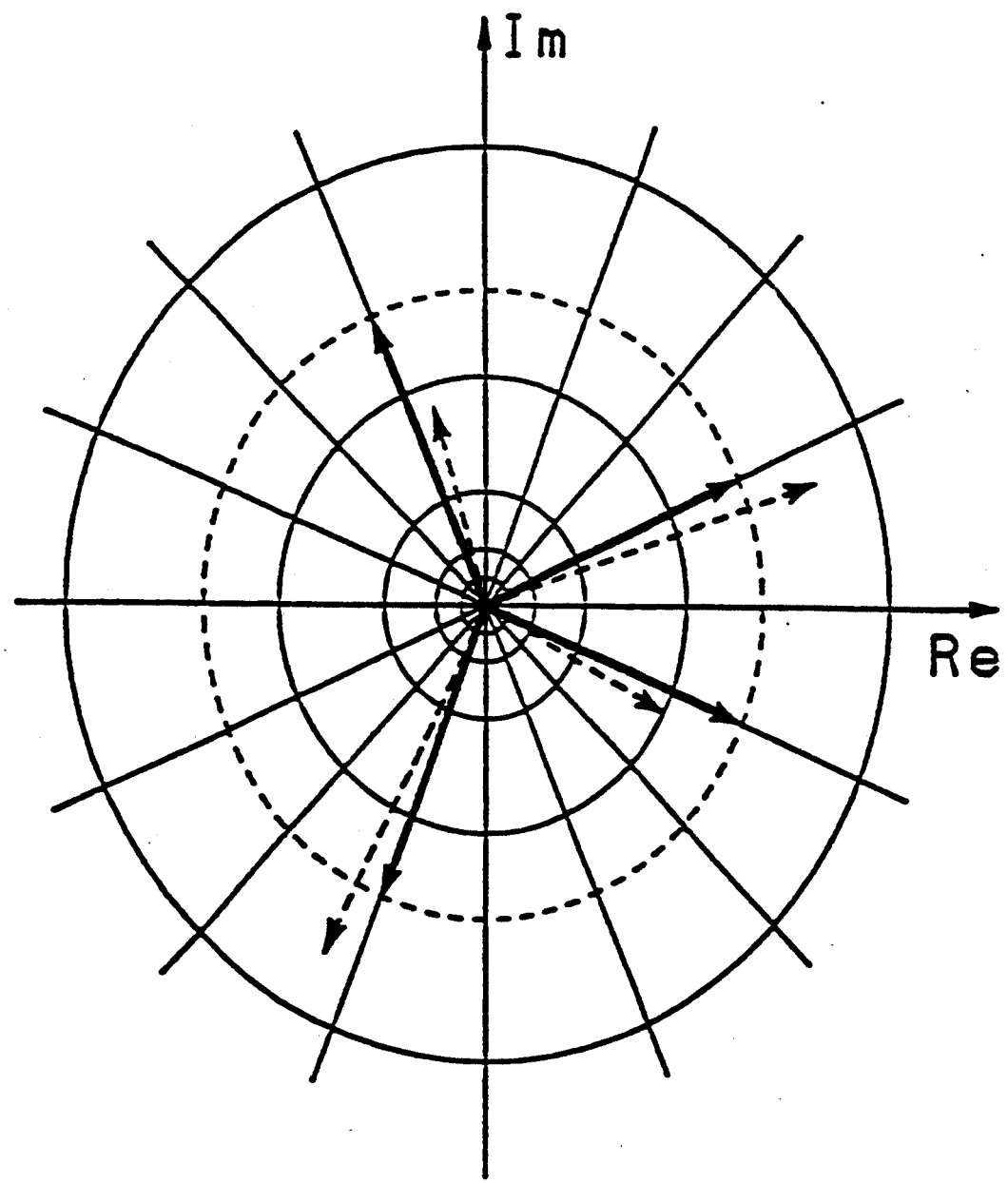
FIG. 6 is a diagram for explaining the linear quantization of phase values in the unit 16 of FIG. 2a and the averaging of the magnitudes for representative values in the unit 18 of FIG. 2a or in the corresponding units of FIG. 2b.

FIG. 6 shows in broken lines vectors to be quantized. If their phases were quantized at 16-bits per spectral value, that would provide about 182 possible values per degree of angle. Consequently, in the range from 0 to 4.8 kHz the phases are quantized with 5 bits, thus at any of 32 angular positions equally spaced around the 360°. Only 16 equally spaced radii are shown in FIG. 6. In the range from 4.8 to 19.4 kHz the phase values are quantized in 4-bits, thus to the nearest of the 16 radii shown in FIG. 6. The solid lines show vectors quantized in phase on a 4-bit basis. If a still coarser representation were made, that could lead to audible disturbances of space perception by binaural listening to processed stereo signals.

The of the vectors are likewise quantized more coarsely for the higher frequencies. The maximum resolution again applies to the lowest frequencies, in this case 7-bits for the range 0 to 980 Hz. From 980 to 2040 Hz the resolution is 6-bits, in the range from 2.04 to 4.8 kHz, 5-bits and from 4.8 to 19.4 kHz 4-bits. Spectral values may extend above 19.4 to 22.05 kHz. Preferably these are not coded. The quantizers in this case are not in uniform steps, but rather in logarithmic steps. The encoding is a base-2 floating point representation of the decision thresholds. The minimum resolution of the quantizer working at 4-bits per value designates the position (or also value) of the most significant binary places (farthest removed from 0). In quantizing with higher resolution the additional bits recover the supplementary bits which are of highest significance after the 4 most significant bits. This floating point representation simplifies the practical carrying out of quantization and the reconstruction in the decoder by means of digital signal processing. The first 4 bits provide the exponent and the first binary place of the mantissa, after which, according to the resolution of quantization, there follows a corresponding number of additional binary mantissa places.

The above described bit distribution within the spectral value blocks is further described in Table 1:

TABLE 1

| Ordinal no. n of Spectral value | Bit allocation per Spectral value | | | Totals | | bit totals |
|---|---|---|---|---|---|---|
| | Absolute Magnitude | | Phase | Number of values | bits per value | |
| | Mantissa | Exponent | | | | |
| 0 | 3 | 4 | 1 | 1 * 8 | = | 8 |
| 1 ... 10 | 3 | 4 | 5 | 10 * 12 | = | 120 |
| 11 ... 22 | 2 | 4 | 5 | 12 * 11 | = | 132 |
| 23 ... 54 | 1 | 4 | 5 | 32 * 10 | = | 320 |
| 55 ... 118 | 0 | 4/2 | 4 | 64 * 6 | = | 384 |
| 119 ... 174 | 0 | 4/4 | 4 | 56 * 5 | = | 280 |
| 175 ... 222 | 0 | 4/8 | 4 | 48 * 4,5 | = | 216 |
| 223 ... 254 | 0 | 0 | 0 | 32 * 0 | = | 0 |
| 255 | 3 | 4 | 1 | 1 * 8 | = | 8 |
| Parallel information per block (bits): | | | | | | 4 |
| Bit totals per block | | | | | | 1472 |

In the recovery for reconstruction of the data on the receiving side (FIG. 3) there is also the addition of offset values so that the reconstruction values lie in the lower ⅜ of the quantization intervals. Tables 2a and 2b show representative values respectively for a 4-bit quantizer and a 5-bit quantizer.

TABLE 2a

| Decision Threshold | Reconstr. Value |
|---|---|
| 0 | 0 |
| 1 | 1 |
| 2 | 2 |
| 4 | 5 |
| 8 | 11 |
| 16 | 24 |
| 32 | 48 |
| 64 | 97 |
| 128 | 193 |
| 256 | 386 |
| 512 | 782 |
| 1024 | 1624 |
| 2048 | 3248 |
| 4096 | 6596 |
| 8192 | 13192 |
| 16384 (32768) | 26384 |

TABLE 2b

| Decision Threshold | Reconstr. Value |
|---|---|
| 0 | 0 |
| 1 | 1 |

TABLE 2b-continued

| Decision Threshold | Reconstr. Value |
|---|---|
| 2 | 2 |
| 4 | 4 |
| 6 | 6 |
| 8 | 10 |
| 12 | 14 |
| 16 | 20 |
| 24 | |
| 32 | 40 |
| 48 | 56 |
| 64 | |
| 96 | 112 |
| 128 | 160 |
| 192 | 224 |
| 256 | 319 |
| 384 | 447 |
| 512 | 639 |
| 768 | |
| 1024 | 1279 |
| 1536 | 1791 |
| 2048 | |
| 3072 | |
| 4096 | 5119 |
| 6144 | 7167 |
| 8192 | 10239 |
| 12288 | |
| 16384 | 20479 |
| 24576 | |
| (32768) | |

Table 2b shows typical reconstruction values in the second column. A complete set of decision thresholds is set forth in the first column.

Following the logarithmic quantization of the magnitude values in the unit 14 of FIG. 2a the magnitudes of the various spectral values are grouped in the unit 18 as follows: In the range from 0 to 4800 Hz there are 56 individual values in the illustrated case (ungrouped). In the range from 4.8 to 10.0 kHz there are 32 groups of 2 values each. In the range from 10.0 to 15.2 kHz there are 14 groups of 4 values, and in the range of 15.2 to 19.4 kHz there are 6 groups of 8 values. In the various groups the average root-mean-square (rms) average value is calculated.

Figure 2B:
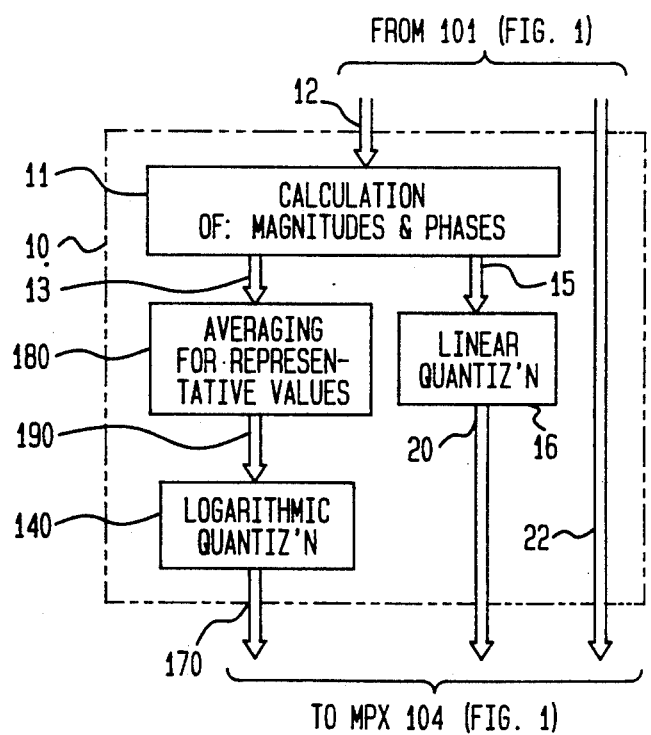

FIG. 2b shows a modification of the data reduction stage illustrated in FIG. 2a. It differs from FIG. 2a in that averaging magnitudes of spectral values within spectral value groups is performed in the unit 180 before the logarithmic quanitization, in the unit 140, thus reversing the sequencing of these two processing steps shown in FIG. 2a. It has been found that with the use of a data reduction stage according to FIG. 2b the quantization error has less influence on the output signal (170 in FIG. 2b), for which reason the process and apparatus of FIG. 2b is preferred. The stage 180 of FIG. 2b operates in the same manner as the stage 18 of FIG. 2a and provides an output 190 which is supplied to the logarithmic quanitizer 140. That logarithmic quantizer operates in the same manner as the quantizer 14 of FIG. 2b.

On the decoder side (FIG. 3; unit 31) all quantized magnitudes within a group are taken as equal to the rms value, itself quantized, which may be referred to therefore as the quantized representative value. Apart from quantization errors, the total energy of the group remains unchanged by this type of data reduction.

The equipment 30 of the invention for approximated data recovery shown in FIG. 3 includes a conversion unit 31 for approximated recovery of the magnitude values. At its inputs 32 the ungrouped magnitudes and the representative values derived from grouped magnitudes are supplied by the preceding demultiplexer 106 shown in FIG. 1. The outputs 33 of the recovery conversion device 31 are connected with corresponding inputs of a second conversion device 34 for representing each of the spectral values by a real part and an imaginary part. The second conversion unit 34 also has inputs 35 to which there are connected conductors of a cable which are connected to additional outputs of the demultiplexer of FIG. 1 for obtaining the quanitzed phase values. Outputs 37 of the second conversion device 34 and cabled conductors 38 from the demultiplexer for providing the scaling factors are supplied to the respective inputs of an inverse FFT and scaling unit corresponding to the inverse FFT and scaling unit 107 shown in FIG. 1.

The manner of operation of the equipment 30 for recovery of the approximated data is as follows:

From direct and representative (averaged) magnitude values available at the inputs 32, the equipment 31 recovers a full set of approximated sub-band signal magnitudes. The group-representative values, where provided, are used as approximations of all the corresponding sub-band magnitudes. The magnitudes made available at the outputs 33, along with the phases supplied through the conductor group 36 by the demultiplexer of FIG. 1 are converted in the unit 34 into representations of the respective spectral values in terms of their real and imaginary components.

The conversion unit 34 performs an operation which the inverse of the operation of the unit 11 of FIG. 2. At the inputs 33 there are presented the magnitudes and at the inputs 35 the phases of the spectral values. The real and imaginary parts are calculated by a conversion from polar to Cartesian coordinates as follows:

$$Z=|Z|*e^{j\phi} \text{ where } |Z|=\text{absolute value of } Z$$

$$\phi=\text{phase of } Z$$

becomes $Z=X+jY$ where $X=|Z|*\cos\phi$, $Y=|Z|*\sin\phi$

Since the phases are represented by at most 5-bits, tables each with a length of 32 values are sufficient for the values of $\sin\phi$ and $\cos\phi$ respectively.

The values made available at the outputs 37 are then supplied, along with the scaling factors supplied by the conductor group 38, to a device for inverse fast Fourier transformation corresponding to the device 107 shown in FIG. 1. In the following overlapping windowing device which corresponds to the device 108 of FIG. 1 at the output of the decoder, the output of the inverse FFT unit 107 is converted into an approximated digital audio signal.

In connection with FIG. 1 the stage 105 for overlapping windowing and the stage 108 inverse in function thereto were briefly mentioned. At this point the overlapping windowing can now be described with reference to FIGS. 4a, 4b and 5.

The problem to which the overlapping windowing feature is directed relates to the block length that should be used for the fast Fourier transformation stage 101 of FIG. 1.

For determining the block length, the objectives are, first, minimizing the amount of auxiliary information that must be transmitted along with the Fourier transforms and, second, good transformation recovery and high spectral resolution. Opposing these objectives there are, among other influences, diminished adaptation possibilities to the short period statistics of the signal and enhanced block effects. By block effects are meant possible signal disturbances on the basis of block-wise processing: for example, echoes. This becomes particularly apparent with the example of a block of great length, which at the beginning has a stiff high-level initial portion and beyond that quiescensce. After coarse quantization of the spectrum and retransformation, the quantization errors are distributed over the duration of the entire block. On the basis of the characteristic of the human ear to conceal disturbances, the defect would be best concealed during the high level prelude and a certain post concealment interval that is dependent upon the level and otherwise perceived as a disturbance (echo).

For the above-mentioned reasons, a block length of 512 sample values is preferably selected. That corresponds to a sampling frequency of 44.1 kHz and a block duration of 11.6 ms.

Even at the selected block length, distinctly audible disturbances appear after unmodified Fourier transformation and retransformation with the use of 16-bit fixed point calculation (taking account of the hardware implementation). On the one hand a disturbing rough hum of about 86 Hz is superimposed which can be ascribed to the block change frequency of 44100/512 Hz and thus plainly a block boundary effect (discontinuities resulting from block-wise processing). On the other hand background noise is audible, the cause of which is to be sought in the limited accuracy of calculation.

In order to suppress the audible block boundary effects an overlapping windowing treatment is introduced. This means, in the illustrated case, that the last 32 sample values of a one block overlap the 32 first sample values of the following block. This is illustrated in the top and middle diagrams of FIG. 4a where the strip 50 shown at the top is the digital signal and the overlapping blocks are shown immediately below the digital signal, with alternate blocks raised to make the overlapping more clear, 3 full blocks 51, 52 and 53 of a succession being shown. The effective block length is now 10.9 ms. A rectangular cosine function is used as the window function, shown in FIG. 5. In that figure the horizontal axis is in terms of the ordinal number of the 512 spectral values beginning with 0 and ending with 511 and the vertical axis is in terms of the weight and running from 0 to 1 allocated to the respective spectral values, as follows:

$$fw(n) = \begin{cases} \sin\frac{\pi}{2} \cdot \frac{n}{32} \\ 1 \\ \cos\frac{\pi}{2} \cdot \frac{n-480}{32} \end{cases} \text{ for } n = \begin{cases} 0 \ldots 31 \\ 32 \ldots 479 \\ 480 \ldots 511. \end{cases}$$

The first windowing stage which precedes the FFT may be referred to as analysis windowing and provides, along with soft block transitions, the advantage of better analysis properties.

Figure 4A:
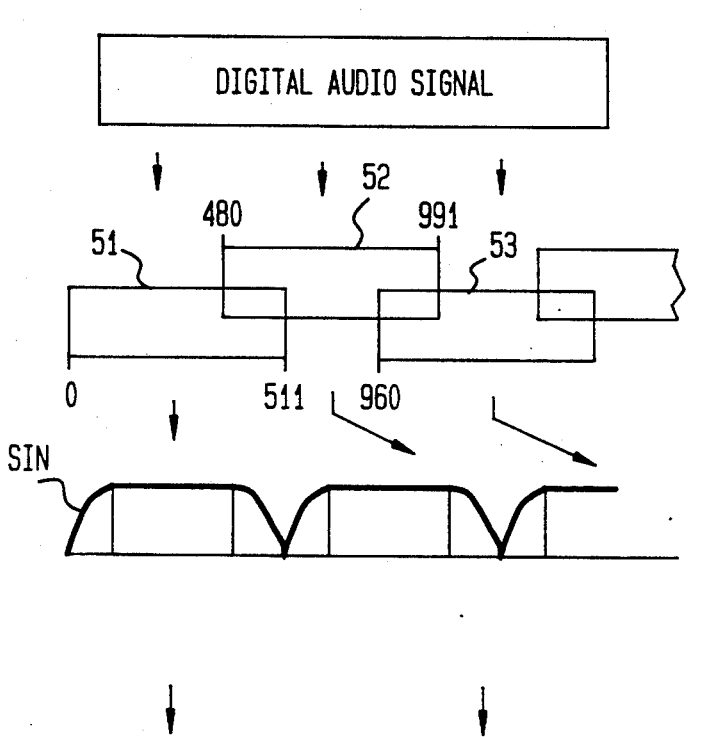
FIG. 4a is a representation of the overlapping windowing operation performed in an embodiment of the invention at the stage 105 of the flow diagram of FIG. 1
Figure 4B:
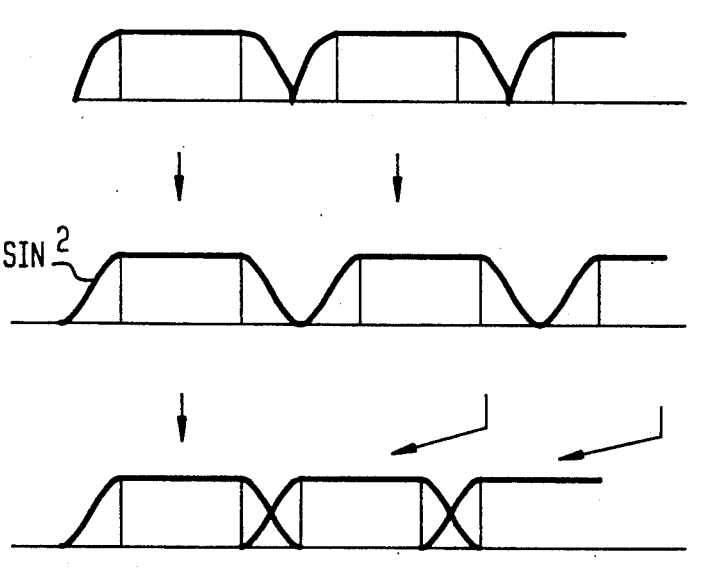
FIG. 4b is a diagram explaining the operation of the overlapping windowing in an embodiment of the invention at the stage 108 of the flow diagram of FIG. 1.

FIG. 4b shows the second overlapping windowing, which may be called synthesis windowing, that follows the inverse FFT stage. There the blocks are again composed of a continuing succession of discrete samples on a time base. In the overlapping region the squared windowing functions add up again to the value 1.

In FIG. 4a the overlaps of the original blocks require time expansion for transmitting them successively as is shown in the third line of FIG. 4a, which is the same kind of succession as is provided for the data reduced blocks which provide the input to the windowing stage 108 of FIG. 1 and are shown at the top line of 4b. The multiplication with the windowing function shown on the next line of FIG. 4b results in squaring the values, which changes the shape of the block ends and in the bottom line, where the overlaps are added, their sums add up to full weight samples, because of the fact that for any angle the square of the sine plus the square of the cosine is equal to unity. It is of course possible to utilize other windowing functions. The rectangular cosine window function has the advantage that audible block-boundary effects can be suppressed with only a 6.25% increase of the quantity of data.

In order to avoid the background noise mentioned above, the accuracy of calculation needs to be raised. In order to make it possible to provide compact hardware implementation, however, the 16-bit decimal point type of calculation should be preserved. This constraint leads mainly to large inaccuracies in the FFT calculation, since for avoiding overflow in the counting region normalization with the factor 2 is usually provided in each stage of the FFT calculation. In the 512 point transformation, therefore, the 9 least significant bits get lost. In order to get around this difficulty an adaptive normalization, more particularly known as block floating point arithmetic, is introduced in the FFT calculation. This means that before every calculation stage it is checked whether an overflow is at all possible. Only in those cases, then, is a normalization performed. By this method the dynamic range of the numerical representation can be optimally utilized. When what has just been described is performed, however, the different spectral blocks have different normalization factors. Each of those factors are transmitted separately to the receiving side of the transmission channel as auxiliary information. In FIG. 1 these normalization factors are designated as the scaling (factors) transmitted from the FFT unit 101 through the data reduction unit 102 (as shown at 22 in FIG. 2) to the multiplexer and then from the demultiplexer through the unit 103 (as shown at 38 in FIG. 3) to the inverse FFT unit 107) of FIG. 1.

This auxiliary information should be particularly well protected against errors occuring in the transmission channel (3 in FIG. 1), because disturbance of this information would lead to jumps in the data flow. In the inverse FFT stage 107 of FIG. 1 similar normalization is performed. In a last step the various blocks in the time domain are again brought to the original level. All normalization (scaling) operations are performed by simple shifting by one or more binary places.

The hardware components for implementing the operations shown in FIGS. 1, 2a or 2b and 3 are commercially available. A 16-bit fixed point vector processor with block floating point arithmetic, which may for example be a processor of type ZR 34161(ZORAN), is preferably used for the direct and inverse window overlapping units and the direct and inverse FFT units and scaling units. For the further processing of the spectral values preferably a general purpose digital signal processor, for example of type DSP 56001 (Motorola) may be used. Peripheral hardware is of course necessary (RAM, clock, pulse generator, etc.) and software (assembler code, etc.) for these processors. Alternatively, the individual signal processors can be combined into a single chip processor for the coder and an additional single chip processor for the decoder. The multiplexer and demultiplexer may likewise be separate or respectively combined with coder or decoder and in any case do not need to be further described here.

Figure 7:
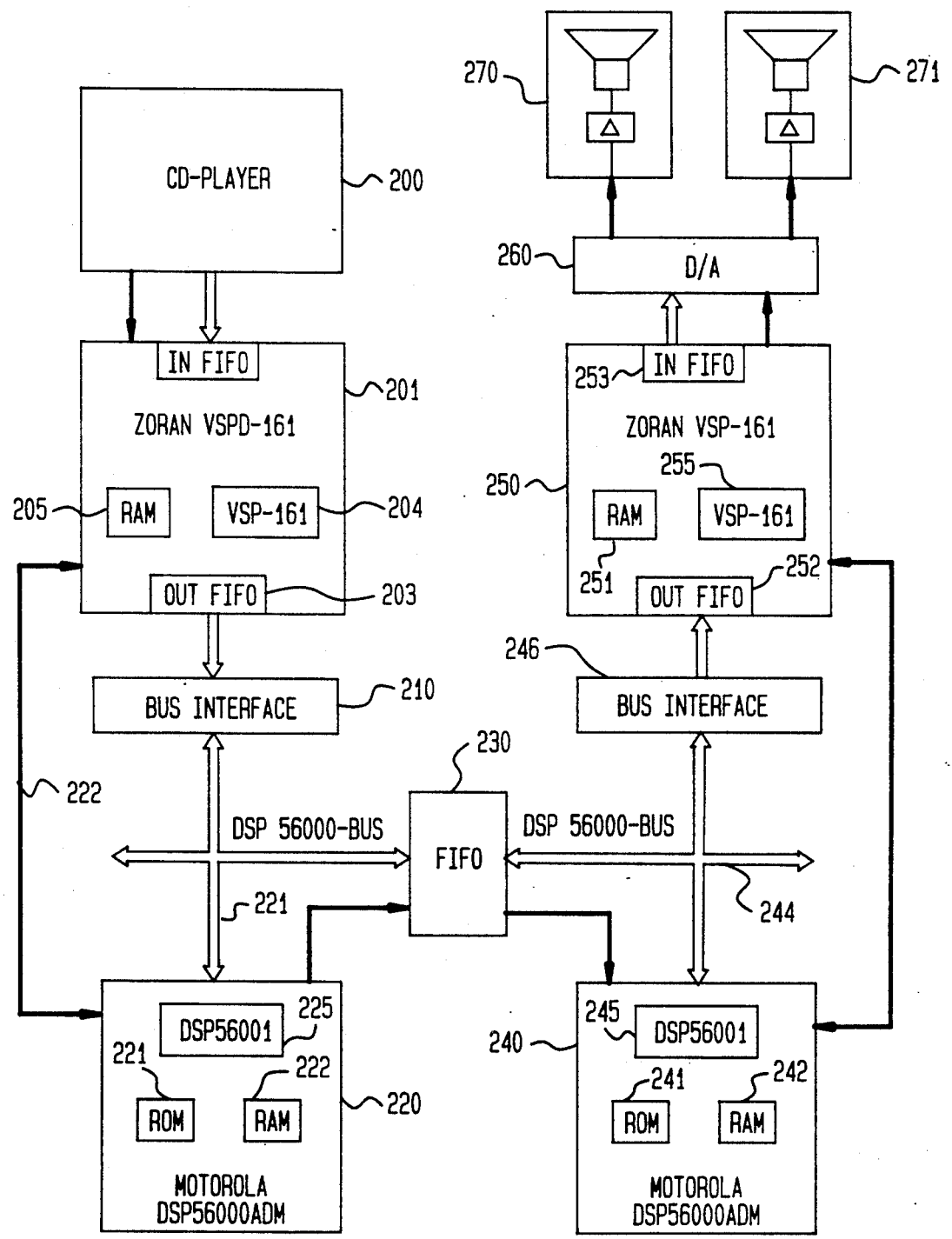
FIG. 7 is a circuit block diagram of an experimental embodiment of the invention.
Figure 8:
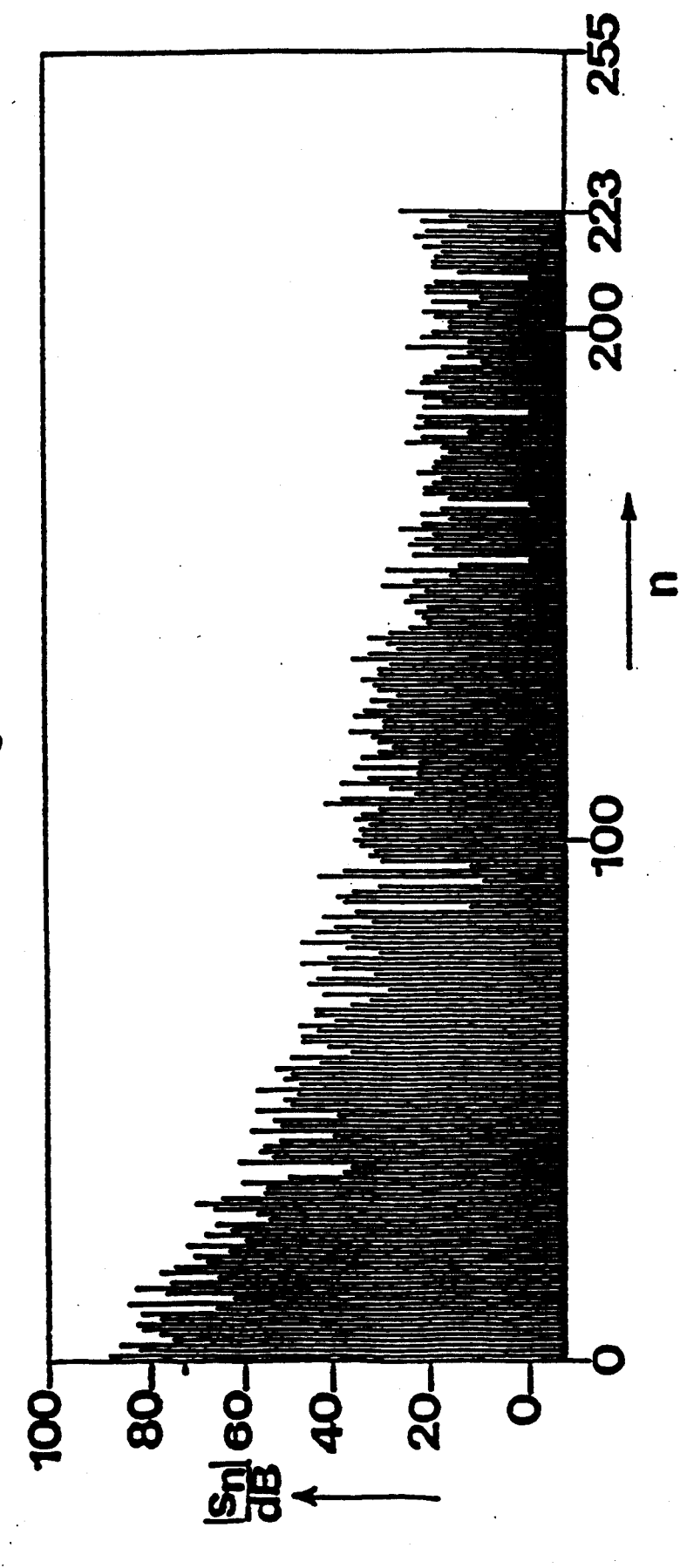
FIGS. 8, 9 and 10 are graphs illustrating the effects of the data reduction of the invention on the magnitudes of spectral values in the system of FIG. 7.
Figure 9:
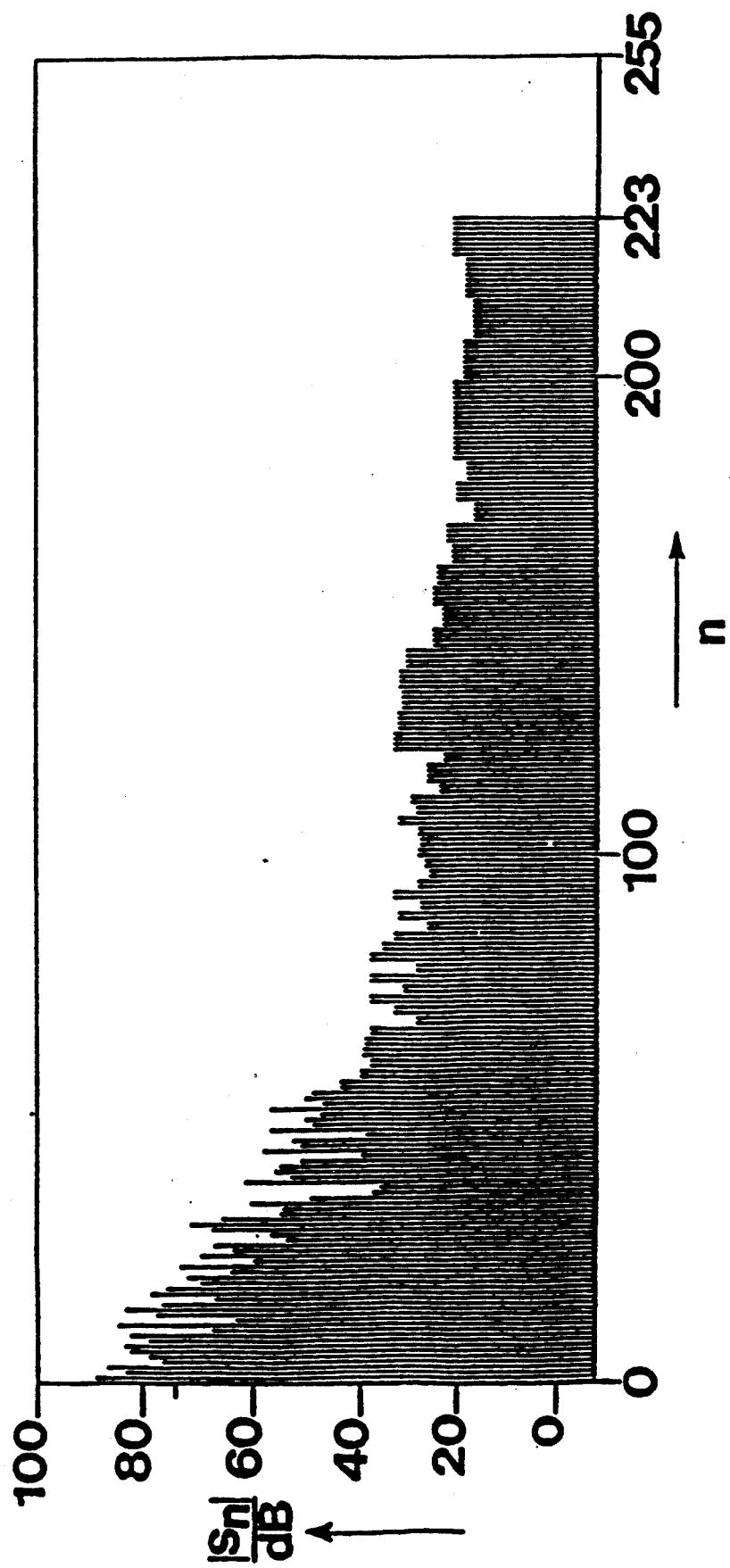
Figure 10:
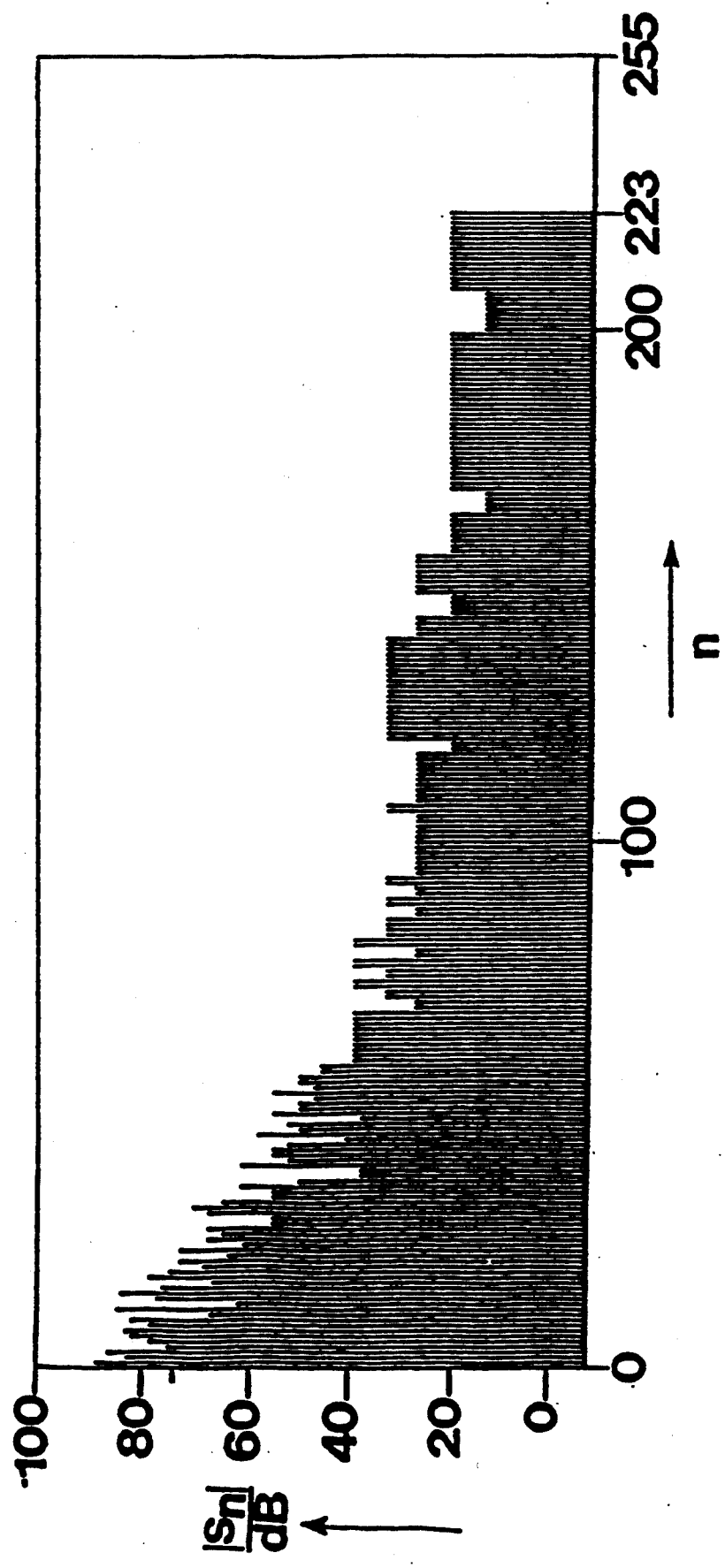

An experimental system embodying the invention using hardware of the kinds above mentioned is illustrated in FIG. 7. FIGS. 8 and 9 show the effect of magnitude value grouping on the magnitude spectrum, on a logarithmic (dB) scale, with the ordinal number n of the spectral values as a scale on the frequency (horizontal) axis. FIG. 10 similarly shows the effect of the magnitude quantization on the magnitude scale.

In FIG. 7 CD player 200 is used as the source of audio signals.

A real time operation requires processing of a block of 512 sample values within at most 11 ms per channel of the stereo signal.

The overlapping windowing is only one of the functions performed by the Zoran VSP 161 vector signal processor 204 in the Zoran VSPD-161 unit 201. This 16-bit processor requires less than 0.8 ms for the necessary FFT calculation over 512 real points. Its block floating-point arithmetic gives it a dynamic range of 144 dB in the calculation of the FFT over 256 complex points. A disadvantage of the vector processor consists in its greatly limited set of commands. For this reason a general purpose digital signal processor 225 of Motorola-type DSP-56001, as part of the Motorola unit 220 of type DSP 56000 ADM, which also includes memories 221 and 222, is used for data reduction in the spectral region. This 24 bit fixed point processor, by virtue of its universal set of commands, offers the possibility of implementing complex algorithms as well as other algorithms. These two processors are coupled through FIFO buffer memories (not shown except for the output FIFO 203 of unit 201). In FIG. 7 the bus of the unit 220 is shown at 221. Interconnections other than the bus are shown by the link 222. The unit 220 and the unit 201 of FIG. 7 include the windowing, the FFT stage and the data reduction.

For the experimental set-up it was not necessary to multiplex the output for transmission through a channel. Instead a FIFO 230 was provided between the coder and the decoder and of course this could be replaced by a channel having interfaces at each end respectively corresponding to the multiplexer and demultiplexer shown in FIG. 1. The decoder on the right hand side of FIG. 7 utilizes the same hardware as the coder for performing the inverse operations of those already described, that hardware being in this case the general purpose digital unit 240 with its processor 245 and its memories 241 and 242 and the unit 250 with its vector signal processor 255 and its memory 251 and FIFO couplers 252 and 253 and the bus interface 246 interposed between the bus 244 of the unit 240 and the input FIFO 252 of the unit 250. The output of the unit 250 goes to a digital to analog converter 260 which feeds the stereo amplifier and loudspeaker system 270, 271.

Signal to noise measurements in this system provided segment-wise values up to 0 dbm, although listeners could not distinguish between the original and the transform-coded music sample. The poor objective measurements, as distinguished from the listener evaluations, appear to have resulted from phase rotations arising from phase quantization as well as from the magnitude grouping and averaging. By these operations the waveshape is doubtless considering changed, but this took place in such a way that hardly any differences were found in human auditory perception. Mainly irrelevance was reduced.

Sound samples 5-15 seconds long were played to listeners equipped with headphones without revealing which of the pair was the original and which the reproduction. The listening tests resulted in a high quality rating of the reproduction from unpracticed listeners, without determination whether practiced listeners would detect directional differences as the result of the possible importance of signal phase in stereophonic (binaural) listening.

The use of direct and inverse fast Fourier transformation units is well known and is described generally in "Orthogonal transforms for digital signal processing" by N. Ahmed and K. R. Rao, (Springer-Verlag, Berlin - Heidelberg - New York 1975) and more recently by N. R. Portnoff in "Time-frequency representation of digital signals and systems based on short-time Fourier analysis". IEEE Trans. ASSP 28 (1980), pgs. 55-69. See also "FFT Basics" Zoran Technical Note, 1987 and another Zoran Technical Note, "Magnitude and Phase Computation with the VSP-161".

Although the invention has been described with reference to a particular illustrated example, it will be understood that variations and modifications may be made within the inventive concept.

I claim:

1. A method of data reduction of a digital audio signal for recording or transmission and for approximated recovery of the digital audio signal after recording or transmission, wherein preliminary steps for data reduction include overlapping windowing followed by fast Fourier transformation to produce spectral values and final steps of approximated recovery include inverse fast Fourier transformation and inverse overlapping windowing, while intermediate steps immediately preceding and immediately following recording or transmission are respectively multiplexing and demultiplexing operations, said fast Fourier transformation steps respectively producing and requiring scaling factors, characterized in that said method further comprises the steps of:

converting said spectral values into spectrally differentiated magnitude values and corresponding phase values:

loqarithmically quantizing said magnitude values;

linearly quantizing said phase values;

grouping and averaging spectrally adjacent quantized magnitude values at least for magnitudes in an upper spectral range extending to the upper spectral extremity of said spectral values to produce representative magnitude values;

multiplexing ungrouped values of said quantized magnitude values, said representative magnitude values, said quantized phase values and also said scaling factors produced by said fast Fourier transformation step, for transmission or recording as a reduced data audio signal.

2. The method of claim 1, further including, after reproducing or reception of a said recorded or transmitted reduced audio data signal, for recovery of an approximated digital audio signal, the steps of:

demultiplexing said reduced audio data signal to separate said scaling factors, said quantized phase values and said magnitude values thereof into separate data streams;

converting combinations of individual phase values with corresponding magnitude values into spectral values each of which is expressed as a combination of a real part and an imaginary part contemporaneously presented at separate outputs, and supplying said demultiplexed scaling factors and said real and imaginary parts of said spectral values to an inverse fast Fourier transformation device, for further processing therein and in following circuits, and for thereby providing an approximated recovered digital audio signal.

3. The method of claim 1, wherein said averaging of groups of quantized magnitude values is performed by root-mean-square (r.m.s.) averaging.

4. The method of claim 1, in which said step of grouping spectrally adjacent quantized magnitude values is performed so as to produce groups which include progressively more spectrally adjacent magnitude values as the spectral frequency increases.

5. The method of claim 1, wherein at least the characterizing steps of the method are performed by electronic signal processing means.

6. The method of claim 2, wherein said further processing includes a second overlapping windowing operation in the time domain following processing in said inverse fast Fourier transformation device.

7. Apparatus for converting the output of a fast Fourier transformation processing stage, to which an overlapping windowed digital audio signal has been supplied, into a reduced-data signal, said output of said fast Fourier transformation stage supplying spectral values of transforms of said digital audio signal at respective outputs and scaling factors at other outputs of said transformation stage, said apparatus comprising:

means for converting said spectral values into spectrally differentiated magnitude values and corresponding phase values;

means for logarithmically quantizing said magnitude values;

means for linearly quantizing said phase values;

means for grouping and averaging spectrally adjacent quantized magnitude values at least for magnitudes in an upper spectral range extending to the upper spectral extremity of said spectral values, to produce representative magnitude values, and means for multipexing ungrouped values of said quantized magnitude values, said representative magnitude values, said quantized phase values and also said scaling factors produced by said fast Fourier transformation stage, for transmission or recording as a reduced data audio signal.

8. The apparatus of claim 7, wherein said averaging means are means for producing root-mean-square averages of contemporaneously appearing magnitude values belonging to the same group of quantized magnitude values produced by said grouping means.

* * * * *